(12) United States Patent
Voelkel

(10) Patent No.: US 9,963,152 B2
(45) Date of Patent: May 8, 2018

(54) METHOD AND DEVICE FOR AVOIDING A TUNNEL VISION

(71) Applicant: Robert Bosch GmbH, Stuttgart (DE)

(72) Inventor: Andreas Voelkel, Ispringen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 14/789,687

(22) Filed: Jul. 1, 2015

(65) Prior Publication Data

US 2016/0009289 A1    Jan. 14, 2016

(30) Foreign Application Priority Data

Jul. 10, 2014    (DE) ........................ 10 2014 213 422

(51) Int. Cl.
| | | |
|---|---|---|
| *B60W 40/08* | (2012.01) | |
| *B60W 50/14* | (2012.01) | |
| B60W 30/08 | (2012.01) | |

(52) U.S. Cl.
CPC ............ *B60W 40/08* (2013.01); *B60W 50/14* (2013.01); *B60K 2350/2052* (2013.01); *B60W 30/08* (2013.01); *B60W 2050/146* (2013.01); *B60W 2420/42* (2013.01)

(58) Field of Classification Search
None
See application file for complete search history.

(56) References Cited

U.S. PATENT DOCUMENTS

| | | | | |
|---|---|---|---|---|
| 5,758,201 A | * | 5/1998 | Watanabe | G03B 13/02 396/51 |
| 9,298,994 B2 | * | 3/2016 | Marti | G06K 9/00845 |
| 2004/0209594 A1 | * | 10/2004 | Naboulsi | G08B 21/06 455/404.1 |
| 2009/0243880 A1 | * | 10/2009 | Kiuchi | G01B 11/26 340/903 |
| 2010/0235035 A1 | * | 9/2010 | Nishira | B60T 7/22 701/31.4 |

(Continued)

FOREIGN PATENT DOCUMENTS

JP          2009093284 A   *   4/2009

*Primary Examiner* — Quan-Zhen Wang
*Assistant Examiner* — Rajsheed Black-Childress
(74) *Attorney, Agent, or Firm* — Norton Rose Fulbright US LLP; Gerard Messina

(57) ABSTRACT

A method for avoiding a tunnel vision of a motor vehicle driver includes detecting an instantaneous viewing direction of the driver; comparing the instantaneous viewing direction with at least one previous viewing direction; detecting a tunnel vision if a rate of change between the viewing directions and/or if an angular range of the viewing direction is not reached; and stimulating the motor vehicle driver to avoid the tunnel vision. A device for avoiding a tunnel vision of the driver includes a camera for detecting an instantaneous viewing direction of the motor vehicle driver; a control unit for comparing the instantaneous viewing direction with at least one previous viewing direction and for detecting a tunnel vision if a rate of change between the viewing directions and/or if an angular range of the viewing direction is not reached, and a device for stimulating the motor vehicle driver to avoid the tunnel vision.

15 Claims, 2 Drawing Sheets

(56) References Cited

U.S. PATENT DOCUMENTS

| | | | |
|---|---|---|---|
| 2010/0253526 A1* | 10/2010 | Szczerba | B60K 28/066 340/576 |
| 2014/0272810 A1* | 9/2014 | Fields | G09B 19/14 434/65 |
| 2015/0194035 A1* | 7/2015 | Akiva | B60Q 9/00 340/575 |
| 2016/0042240 A1* | 2/2016 | Takeda | G06K 9/00597 382/104 |

* cited by examiner

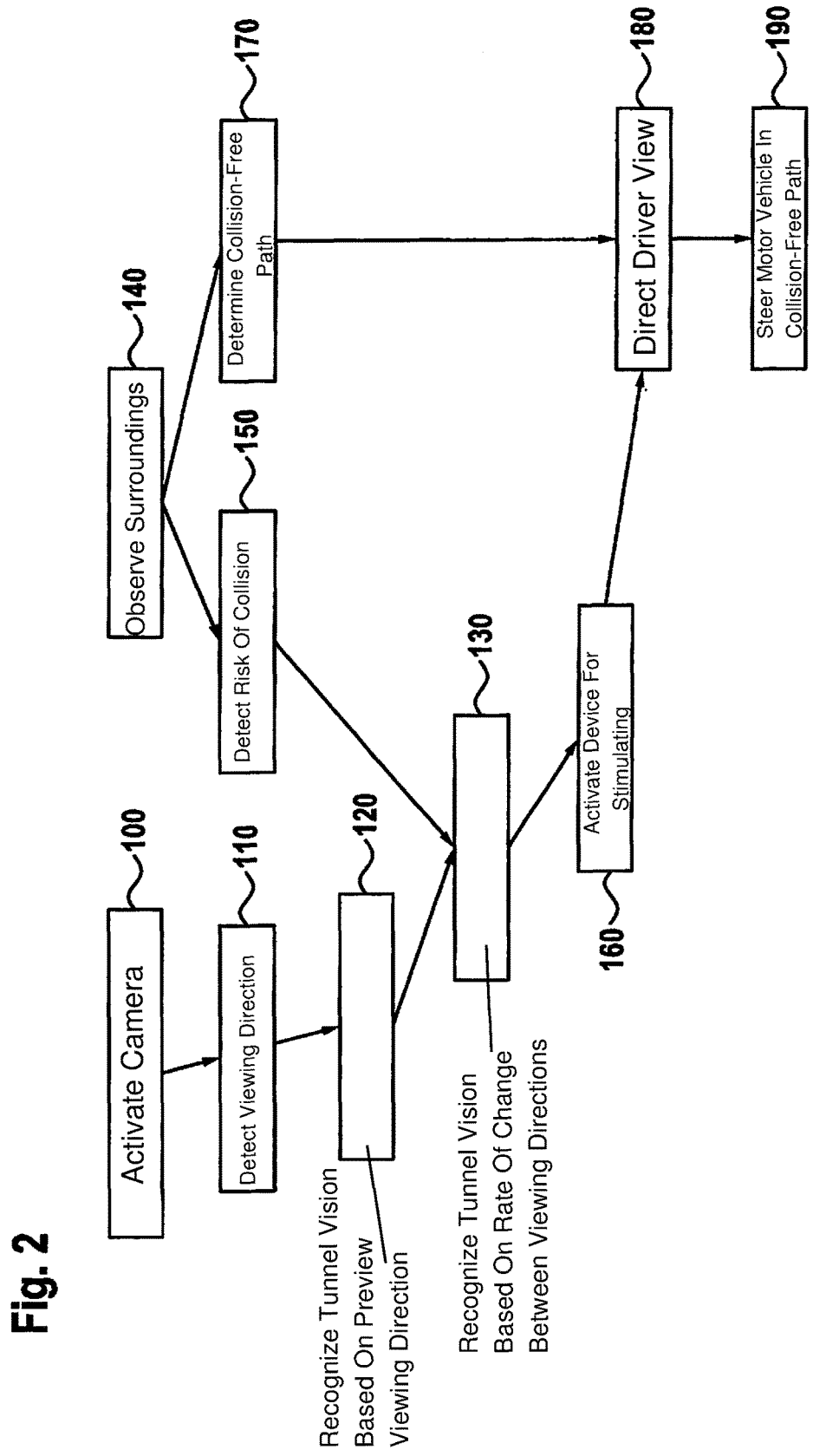

METHOD AND DEVICE FOR AVOIDING A TUNNEL VISION

RELATED APPLICATION INFORMATION

The present application claims priority to and the benefit of German patent application no. 10 2014 213 422.6, which was filed in Germany on Jul. 10, 2014, the disclosure of which is incorporated herein by reference.

FIELD OF THE INVENTION

The present invention relates to a method and a device for avoiding a tunnel vision of a motor vehicle driver.

BACKGROUND INFORMATION

In dangerous situations, the probability is very high that the driver or vehicle driver of a motor vehicle will develop a tunnel vision in the direction of the impending collision and therefore no longer perceive possible avoidance lanes or paths for driving around the collision. Due to the tunnel vision, it is often no longer possible to escape and avoid the collision.

SUMMARY OF THE INVENTION

The method according to the present invention for avoiding a tunnel vision of a motor vehicle driver basically includes the following steps:
- detecting an instantaneous viewing direction of the motor vehicle driver;
- comparing the instantaneous viewing direction with at least one previous viewing direction;
- detecting a tunnel vision if a rate of change between the viewing directions is not reached and/or if an angular range of the viewing direction is not reached; and
- stimulating the motor vehicle driver to avoid the tunnel vision.

The tunnel vision may also be referred to as a fixed gaze, concentric narrowing of the field of vision or tubular field of vision. The tunnel vision acts as a narrowing of the driver's field of vision to an actual danger area or presumed danger area. If a tunnel vision or an emerging tunnel vision is detected, the driver is stimulated or exposed to stimuli which avoid tunnel vision. The stimulation may be carried out preventively in the case of emerging tunnel vision and/or in the case of tunnel vision already present in order to avoid the tunnel vision. This advantageously makes it possible to avoid collisions based on the driver developing a tunnel vision, which prevents the driver from avoiding this collision itself by using correct eye movements.

In one particular specific embodiment, it is provided that the motor vehicle driver is stimulated, if in addition a predictive safety system of the motor vehicle detects a danger in an instantaneous path of travel of the motor vehicle. While a tunnel vision alone is already critical, it is highly critical in combination with a danger and/or collision probability detected by one or multiple safety systems. Accordingly, stronger or additional stimuli may be used in this case. It is also possible to use other comparison or limiting values for detecting the tunnel vision in this situation. The additional inclusion of the safety system further increases the safety and also provides a plausibility check of the danger situation.

The method according to the present invention in possible combination with surroundings sensor systems very advantageously makes it possible for the stimulation to include information concerning a collision-free path of travel for the motor vehicle. Consequently, not only will the tunnel vision be interrupted, but instead a possible avoidance lane or an alternative path of travel is proposed to the driver, or his viewing direction and consequently his attention is directed to it. This dual function further increases the safety.

The stimulation may be a visual stimulation. Since this stimulation, for example, in the form of light stimuli, directly addresses the sensory organs affected by the tunnel vision, namely the eyes, it is the most effective. Alternatively, other sensory levels, for example, the ears, the sense of touch (for example, vibration in the steering wheel) or the skin (for example, via a brief tightening of the safety belt) may be used.

A tunnel vision may be detected if the rate of change and/or the angular range are below a threshold value for a predefined period of time. Over the period of time, an inertia of the process may be set, so that the risk of false alarms is reduced. The period of time may range from a few seconds, which may be one through three seconds, or be reduced to milliseconds.

According to one specific embodiment of the present invention, it is provided that a view vector is generated from the viewing direction and the view vector is analyzed. The further processing or analysis of a vector, in particular its spatial direction, may be done quickly and safely in a simple manner.

The device according to the present invention for avoiding a tunnel vision of a motor vehicle driver includes a camera for detecting an instantaneous viewing direction of the motor vehicle driver; a control unit which is configured for comparing the instantaneous viewing direction with at least one previous viewing direction and for detecting a tunnel vision if a rate of change between the viewing directions is not reached and/or if an angular range of the viewing direction is not reached, and a device for stimulating the motor vehicle driver to avoid the tunnel vision. The same advantages and modifications as described above are applicable.

The device for stimulating may include a visual display. Since a visual display, for example, in the form of light stimuli, directly addresses the sensory organs affected by the tunnel vision, namely the eyes, it is the most effective.

The visual display may be situated in the area of a windshield of the motor vehicle. There, it may be directly noticed by the driver.

In one particular specific embodiment, it is provided that the visual display includes at least one LED and/or a laser for displaying information. The information may, for example, represent a notification such as a directional indication to a collision-free avoidance path. The LED or the laser may be an integral part of an already existing system such as a head-up display (HUD).

Exemplary embodiments of the present inventions are depicted in the drawings and explained in greater detail in the following description.

BRIEF DESCRIPTION OF THE DRAWINGS

FIG. 2 shows a flow chart of a method for avoiding a tunnel vision.

DETAILED DESCRIPTION

Figure 1:
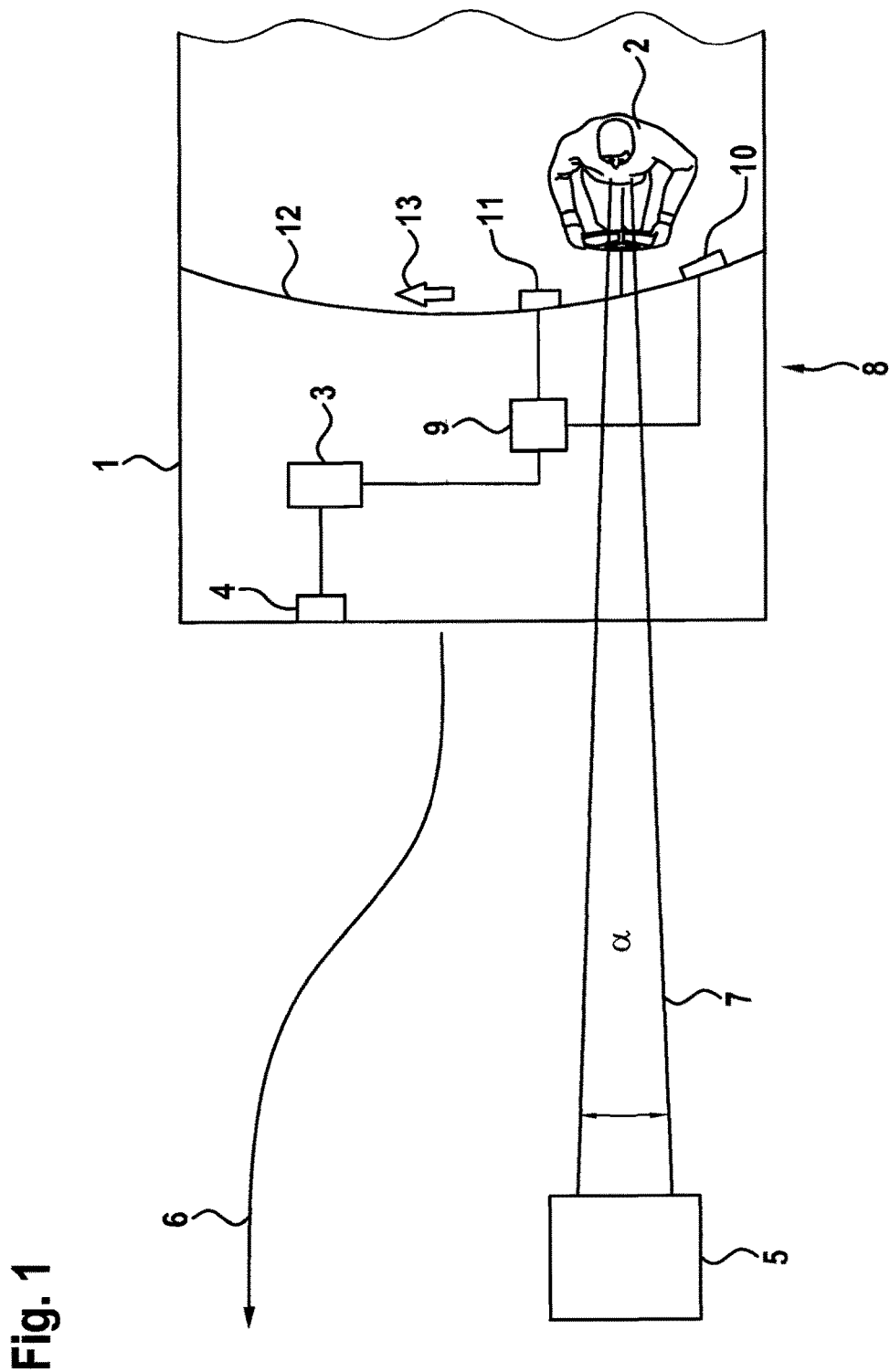
FIG. 1 shows a schematic representation of a motor vehicle including a device for avoiding a tunnel vision.

FIG. 1 shows in schematic representation a front area of a motor vehicle 1 which is driven by a motor vehicle driver 2. The term motor vehicle here includes land-based motor vehicles, for example, passenger cars, trucks, buses, motorcycles, etc., watercraft, for example, ships or ferries, and aircraft, for example, airplanes.

Motor vehicle 1 includes a predictive safety system 3, which evaluates information or measured values from at least one sensor 4. It is thus possible to detect, among other things, objects or obstacles 5 located ahead of motor vehicle 1, which could result in a collision if the direction of travel were retained. Furthermore, predictive safety system 3 is able to calculate an alternative collision-free path of travel 6 that makes it possible to bypass obstacle 5.

Motor vehicle driver 2, who approaches obstacle 5 with his motor vehicle 1, has a tunnel vision 7 directed to obstacle 5. Tunnel vision 7 is characterized in that the complete attention of vehicle driver 2 is directed to obstacle 5. Consequently, the viewing range or viewing angle of motor vehicle driver 2 is focused on obstacle 5 with a narrow angular range α. Collision-free path of travel 6, which may also be referred to as a possible alternative route, is therefore not recognized by motor vehicle driver 2.

To avoid or interrupt tunnel vision 7, motor vehicle 1 includes a device 8 for avoiding tunnel vision 7 of motor vehicle driver 2. Device 8 includes a control unit 9, a camera 10 for detecting the viewing direction of motor vehicle driver 2, and a device 11 for stimulating motor vehicle driver 2 to avoid tunnel vision 7. Control unit 9, which may be a stand-alone control unit or an integral part of another unit, such as, for example, safety system 3 or additional units, detects the signals from camera 10 and evaluates them. Furthermore, control unit 9 is connected to safety system 3 and receives information from it concerning possible dangers or collisions, for example, via obstacle 5, and concerning a possible collision-free path of travel 6.

Based on this information, control unit 9 detects tunnel vision 7 or determines that a critical situation is present and activates the device for stimulating 11. Device 11 is situated in the area of a windshield 12 of motor vehicle 1. Device for stimulating 11 generates a light stimulus, for example, via an LED or a laser, in order to thus interrupt tunnel vision 7 of motor vehicle driver 2 and to direct his attention to the stimulation or the visual stimulus.

In addition, the device for stimulating 11 may display information 13, which is shown here, for example, via a laser on windshield 12. This piece of information, here in the form of an arrow, shows motor vehicle driver 2 the way to a collision-free path of travel 6. Information 13 or the notification may be provided as an alternative or in addition to the light stimulus. It is also possible to display information 13 only after tunnel vision 7 has been interrupted by stimulation of motor vehicle driver 2. The interrupted or eliminated tunnel vision is detected by camera 10 in connection with control unit 9.

Device 11 may also be an integral part of an existing system such as a head-up display.

The method for avoiding tunnel vision 7 is described in greater detail below with reference to FIG. 2.

In a first step 100, camera 10, or driver observation camera, is activated and begins to record the eyes, or eye movements, of motor vehicle driver 2. The camera may deliver single images or video signals. The signals from camera 10 are then transmitted to control unit 9.

In a further step 110, the viewing direction is detected. This process is carried out in control unit 9. For this purpose, view vectors are generated from the images of camera 10, which is able to produce still images or moving images, the view vectors characterizing the instantaneous viewing direction of motor vehicle driver 2. The view vectors or the viewing directions are stored in a memory of control unit 9.

In a further step 120, a tunnel vision is recognized or detected. For this purpose, the instantaneous viewing direction or the instantaneous view vector is compared with at least one previous viewing direction or a previous view vector. A previous value is here a value from an earlier point in time. It is possible that the instantaneous value is only compared with the chronologically immediately preceding value. On the other hand, it is possible that the instantaneous value, i.e., viewing direction or view vector, is compared with multiple values of a predefined time period before the instantaneous value.

In a further step 130, a tunnel vision 7 is detected when a rate of change or a limiting value of the rate of change between the viewing directions or view vectors is not reached. The rate of change in this case is a measure of how often the view of motor vehicle driver 2 changes direction. In the case of fixation on an object, such as obstacle 5, a tunnel vision 7 occurs having a very low rate of change of the viewing direction of, for example, less than 0.1°/ms, which may be less than 0.05°/ms. Here, it is also possible to infer an imminent tunnel vision 7 if the rate of change decreases. Furthermore, tunnel vision 7 may be detected if a certain angular range of the viewing direction is not reached, or in other words, when angle α of the field of view of motor vehicle driver 2 is below a certain angle or a limiting value of between 10° and 50°, which may be 30°. Tunnel vision 7 may be detected if one or both of these criteria are met.

In a further branch of the method, predictive safety system 3 is now evaluated. In a step 140, safety system 3 observes the surroundings, in particular the area ahead of motor vehicle 1.

In a step 150, a risk of collision with an obstacle 5 is detected. This piece of information is output by safety system 3 to control unit 9. In a step 130, the result of safety system 3 may be used as an additional criterion for the detection of tunnel vision 7. It is also possible to use this piece of information of safety system 3 for a plausibility check of the observation of the viewing direction of motor vehicle driver 2.

If a tunnel vision is detected, the device for stimulating 11 is activated in a step 160, so that a visual stimulation of motor vehicle driver 2 takes place for eliminating tunnel vision 7.

In a step 170, safety system 3 is able to calculate or detect a possible collision-free path of travel 6 for a collision-free bypass of obstacle 5. This possible collision-free path of travel 6 is made available to control unit 9.

In another step 180 which follows the step of visual stimulation 160, the view of motor vehicle driver 2 is directed with the aid of information 13 to possible collision-free path of travel 6.

In another step 190, motor vehicle driver 2 is able to steer motor vehicle 1 in the direction of collision-free path of travel 6, drive around obstacle 5 and thus avoid a collision.

What is claimed is:
1. A method for avoiding a tunnel vision of a motor vehicle driver driving a motor vehicle, the method comprising:
   detecting a plurality of viewing directions of the motor vehicle driver, each viewing direction corresponding to a different moment in time, and the plurality of viewing directions corresponding to a predefined period of time;
   storing the plurality of viewing directions;

detecting, via a control unit, an instantaneous viewing direction of the motor vehicle driver, wherein a time of the instantaneous viewing direction is preceded by the predefined period of time;

comparing, via the control unit, the instantaneous viewing direction with more than one of the stored viewing directions of the period of time to determine a rate of change between the instantaneous viewing direction and at least one of the stored viewing directions;

determining a risk of collision with an obstacle that is within a field of view of the motor vehicle driver;

detecting, via the control unit, a tunnel vision if the risk of collision is above a predetermined criterion and the rate of change is below a limiting value; and in response to detecting the tunnel vision, stimulating the motor vehicle driver to avoid the tunnel vision.

2. The method of claim 1, wherein the motor vehicle driver is stimulated if, in addition, a predictive safety system of the motor vehicle detects a danger in an instantaneous path of travel of the motor vehicle.

3. The method of claim 2, wherein the stimulation includes a notification concerning a collision-free path of travel for the motor vehicle.

4. The method of claim 1 wherein the stimulation is a visual stimulation.

5. The method of claim 1, wherein a view vector is generated from the viewing direction and the view vector is analyzed.

6. A device for avoiding a tunnel vision of a motor vehicle driver, comprising:
a camera that:
detects a plurality of viewing directions of the motor vehicle driver, each viewing direction corresponding to a different moment in time, and the plurality of viewing directions corresponding to a predefined period of time, and detects an instantaneous viewing direction of the motor vehicle driver, wherein a time of the instantaneous viewing direction is preceded by the predefined period of time;

a control unit to determine a risk of collision with an obstacle that is within a field of view of the motor vehicle driver, and to perform a comparison of the instantaneous viewing direction with inure than one of the stored viewing directions of the period of time to determine a rate of change between the instantaneous viewing direction and at least one of the stored viewing directions, wherein:
the control unit detects a tunnel vision if the risk of collision is above a predetermined criterion and the rate of change is below a limiting value; and
a stimulating device to stimulate, in response to the control unit detecting the tunnel vision, the motor vehicle driver to avoid the tunnel vision.

7. The device of claim 6, wherein the device for stimulating includes a visual display.

8. The device of claim 7, wherein the visual display is situated in the area of the windshield of the motor vehicle.

9. The device of claim 7, wherein the visual display has at least one LED and/or a laser for displaying information.

10. The method of claim 1, wherein the limiting value is 0.1°/ms.

11. The method of claim 1, wherein the limiting value is 0.05°/ms.

12. The device of claim 6, wherein the limiting value is 0.1°/ms.

13. The device of claim 6, wherein the limiting value is 0.05°/ms.

14. The method of claim 1, wherein an imminent tunnel vision is detected if the rate of change decreases.

15. The device of claim 6, wherein the control unit is adapted to detect an imminent tunnel vision if the rate of change decreases.

* * * * *